United States Patent [19]

Decelles et al.

[11] 3,868,471

[45] Feb. 25, 1975

[54] PROCESS FOR PREPARING CLUSTERED, MIXED READY TO EAT CEREAL PRODUCTS

[75] Inventors: George A. Decelles; Violet M. Larson, both of Minneapolis, Minn.

[73] Assignee: The Pillsbury Company, Minneapolis, Minn.

[22] Filed: Apr. 9, 1973

[21] Appl. No.: 349,340

[52] U.S. Cl.............. 426/303, 426/93, 426/305, 426/307, 426/309
[51] Int. Cl............................................... A23l 1/10
[58] Field of Search ......... 426/93, 98, 99, 297, 302, 426/304, 305, 307, 309, 303

[56] References Cited
UNITED STATES PATENTS

| | | | |
|---|---|---|---|
| 1,286,766 | 12/1918 | Post | 426/93 |
| 3,484,250 | 12/1969 | Vollink et al. | 426/305 X |
| 3,582,336 | 6/1971 | Rasmusson | 426/93 |
| 3,617,309 | 11/1971 | Rebane | 426/93 |
| 3,769,438 | 10/1973 | Rush et al. | 426/99 |

*Primary Examiner*—Raymond N. Jones
*Attorney, Agent, or Firm*—James V. Harmon; Michael D. Ellwein

[57] ABSTRACT

Clusters of ready-to-eat cereals are produced by coating a mixture of a raw cereal base and additional cereal grains with an edible oil and permitting the oil to penetrate the cereal surface. A syrup coating is then applied while agitating to form clusters having a substantially continuous double film thereon. The clusters are then roasted and dried.

3 Claims, 3 Drawing Figures

PROCESS FOR PREPARING CLUSTERED, MIXED READY TO EAT CEREAL PRODUCTS

FIELD OF THE INVENTION

The present invention relates to ready-to-eat cereals and more particularly to ready-to-eat clustered cereals having a content of sugar.

THE PRIOR ART

This invention is directed to the production of clustered, mixed ready-to-eat cereal products containing sugar in one form or another. Many such products have been marketed in the past, and a number are being marketed at the present time. These products are commonly called granola and usually have a base consisting of flattened or rolled whole cereal grain that have been first softened, for example by steaming or soaking in water. These grains typically consist of wheat, rye or oats or mixtures thereof. These base cereals are mixed with various other cereal grains, cocoanut, cereal grain parts or nutmeats in relatively smaller amounts. Examples are wheat germ, shredded dry cocoanut, sesame seeds, etc. Some of these products include various sugar containing substances such as honey, corn syrup or sugar in crystalline form for sweetness. These products also contain vegetable oil to modify the texture primarily by softening them for eating as a snack, i.e., without milk and sugar. The oil is frequently used in the amount of from about 3–18 percent.

One of the major shortcomings of these prior products is the limitation of their shelf life. Even the best of these products have a shelf life of only three or four months, which may not be long enough for distribution through the normal channels and at the end of this time they frequently exhibit a substantial degree of rancidity. Now if in addition to this period the consumer allows the product to stand on his shelf for a month or two, it may well become so rancid as to become unpalatable. A part of the problem is due to the characteristics of the rolled cereal, e.g., rolled oats which contain a fairly high amount of lipids so that if they are dried to a low moisture content, e.g., 2 percent or less they are much less stable. An additional source of rancidity is the oil added to impart softness to the product. In products which contain 3 percent oil or less, rancidity is not nearly so much a problem but the product is quite hard and is consequently fairly tough when chewed. Preservatives can, of course, be used but many consumers are desirous of obtaining foods without preservatives and it is a general objective of the present invention to achieve satisfactory shelf life without the use of artificial chemical preservatives. Preservation in other words is to be accomplished solely by natural ingredients and processing conditions and sealed without the addition of color, flavor, or artificial chemical preservatives.

Rancidification of the added oil is especially difficult to deal with because the spreading out of the oil on the surface of the cereal increases the opportunity for attack by oxygen and therefore tends to accelerate the formation of free fatty acids and peroxides. Thus, while it is possible to obtain a shelf life of six months or more with little or no added oil, the eating characteristics of the product are unsatisfactory. However, with the right amount of oil the shelf life becomes relatively short.

Concerning texture, the desired objective is to obtain a degree of softness together with a degree of crunchiness. It was also found in work leading to the development of the present invention that the addition of sugar in crystalline form while it adds sweetness does not add much to the crunchiness of the product, and does not form a discrete, substantially continuous barrier.

A further problem results from the moisture absorbing character of the flattened cereal which in that form is particularly porous and tends upon the direct addition of syrup to form a lumpy dough which is highly undesirable.

Until the present invention was developed, no way was known as far as is known to solve all of these problems in a single product since an improvement in one characteristic tended to impare another.

A further problem encountered in the prior art is the formation of lumps which occur when the product is passed through rotating tumbling drums which are normally used for heating and roasting the product.

OBJECTS OF THE INVENTION

The primary objects of the present invention are to provide an improved ready-to-eat clustered, mixed cereal product having the following characteristics and advantages (a) a shelf life of at least 6 and preferably 8 months when stored in plastic bags at room temperature when containing at least about 5 percent added edible lipid to impart softness to the product, (b) a crunchy eating characteristic with no hard pieces or lumps (c) the ability to flow freely when poured, (d) little if any dough formation upon mixing and few if any relatively larger lumps and specifically no particles so large that they will not pass through ¾ inch USBS mesh screen and preferably three-fourths of the product being able to fall through a ⅝ inch USBS screen (e) provide relatively uniform sized pieces (f) a minimum of fines and specifically less than 0.6 percent will pass through a USBS 16 mesh screen when the dried final product is subjected to vibration for 15 seconds on a Rototap Test Instrument Model "Rotap Sieve Shaker" by the W. S. Tyler Company of Cleveland, Ohio and (g) little tendency to form lumps over ½ inch in diameter during the roasting process.

THE FIGURES

SUMMARY OF THE INVENTION

Figure 1:
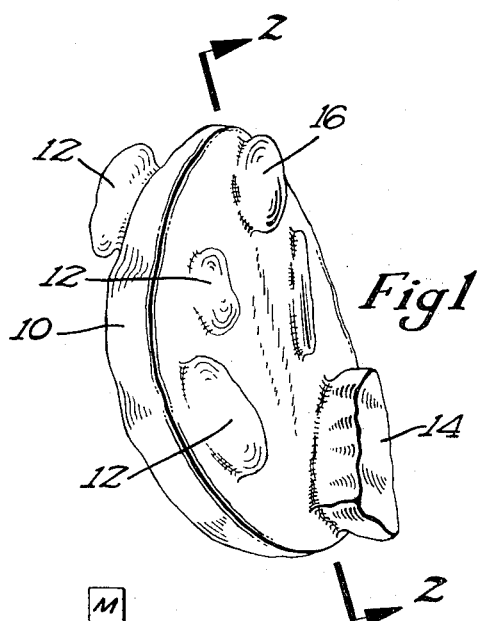
FIG. 1 is a perspective greatly enlarged view of a cluster of product embodying the invention.

A ready-to-eat cereal product is described which comprises clusters or agglomerates of a base consisting of rolled or flattened substantially whole cereal grains such as wheat, rye or oats together with minor amount of other cereals, cereal parts or seeds such as wheat germ, sesame seeds, cocoanut and the like. These products are first coated with an edible oil or fat in the amount of from about 3–18 percent and allowed to penetrate their surfaces. After the lipid coating has been applied, the second coating is applied consisting of syrup formed from water which is an edible mono or disacchride, or mixtures thereof so that the syrup coats the cereals to form a substantially continuous and separate, i.e., discrete film thereon. Additional optional ingredients such as nutmeats are then added and the product is roasted at a temperature of between about 250° and 600°F. but preferably between about 300° to 450°F. for about 10–20 minutes until the product has obtained a golden brown color and a cooked odor and taste and the moisture content is reduced to less than 5 percent, typically 2 percent. Additional optional ingredients such as dried fruit can be then added.

The product is prepared by mixing the cereals as well as the cereal parts and nuts if any, impregnating at least the surfaces of the cereal with the fat and thereafter applying the sugar syrup with stirring to distribute the syrup as a continuous film over the surfaces of the solid particles. The product is then roasted and the mixture content is reduced to about 5 percent or less.

DETAILED DESCRIPTION

To begin production, the base cereal, e.g., crushed or rolled cereal such as wheat, rye or oats or mixtures thereof is placed in a suitable mixer and dry blended with minor solid ingredients such as cocoanut, seeds or cereal parts, nutmeats etc. This can be done for example on a Reedco Cookie Dough Mixer (1,500 lbs. batch size) at 25 rpm. for 15 seconds or until fairly uniformly blended without breaking up the oats.

An edible oil or fat is then introduced in the amount of from about 3–18 percent and preferably from about 3.5–8 percent by weight of the total mix before it is dried, i.e., on a wet basis. The amount of oil will determine the softness of the product, with the greataer amounts of oil producing a softer product. No more should be added in any event than can be absorbed by the cereal. As mentioned briefly above, when 3 percent or less is used the product tend to be rather hard or tough when chewed.

As used herein, "edible fat" means any of various liquefiable solid and semi-solid or liquid organic compounds comprising the glyceride esters of fatty acids and associated phosphatides, sterols, alcohols, hydrocarbons, detones and related compounds and mixtures thereof.

Among the liquid edible fats which may be employed are cottonseed oil, corn oil, peanut oil, soybean oil, olive oil, safflower oil, sesame oil, sunflower oil, melted lard, melted margarine and margarine base, melted butter and butter oil, and the like used singly or in admixture. The fats may be solid at room temperature but must be liquid at the temperature at which applied.

Among the various oil and fats that can be used are cocoanut oil either natural or hydrogenated, nut oils, vegetable oils, cottonseed oils, safflower oil, olive oil, peanut oil as well as animal fats and oils, Specially processed, fractionated cocoanut and soy oils are particularly stable. One especially suitable oil is a natural, unrefined peanut oil which contains natural antioxidants which tend to slow down the rancidification. Other fats and oils will be apparent to those skilled in the art. The term "fat" as used herein is intended to be used in the broad generic sense to mean any edible, animal or vegetable oil either solid or liquid at room temperature including both saturated and unsaturated forms as well as hydrogenated and unhydrogenated fats and mixtures thereof. Mixing of the oil should continue preferably for only about 10–15 seconds to minimize the breaking of oats. It is at this point after the oil has been added and penetrates at least the surface layer of the cereal that the syrup is added.

The syrup is used in the amount of from about 10–50 percent and preferably from about 15–25 percent wet weight basis as a portion of the total wet finished product. The syrup can be formed from any mono or disaccharide or mixtures thereof including but not limited to honey, corn syrup, sucrose and the like. An especially good syrup is made up by dissolving brown sugar, which consists of crystalline sucrose and a small amount of molasses to form a syrup having a 50–80 percent and preferably about 68–72 percent solid basis. This syrup is heated if desired, but not above boiling, to control viscosity. Generally, the syrup should not be warmed so much that it penetrates the cereal to any extent, the object being simply to form a substantially continuous surface layer or envelope over the layer of oil impregnated material on the surface of the cereal.

The minimum amount of syrup that can be used is determined by rancidification and it has been discovered that the continuous film of syrup over the oil is instrumental in reducing rancidification. For this reason, good shelf life cannot be obtained with amounts of syrup ranging less than about 10 percent solids by weight in the finished product. On the other hand, if the amount of syrup is too great it will tend to run off the product or stay in the mixer or otherwise separate. The fat layer prevents syrup penetration and hence tends to extend the effectiveness of the syrup.

After the syrup has been added and agitated, e.g., by mixing to distribute the syrup over the surface of the cereal and coat the fat the product is roasted, for example for 16 minutes in a zone heater of decreasing temperature beginning at about 450° F. and ending 16 minutes later at 350° F. Other forms of heating can, of course, be used including microwave heating and the like. The roasting accomplishes a number of objectives. It imparts a brown and preferably a golden brown color to the product, a nutty flavor and cooks the product. The raw grain taste is removed during roasting and moisture is reduced to 5 percent or less, preferably 2 percent or less.

Following roasting, additional optional ingredients can be added such as dried fruit and the like. Tests to evaluate shelf life, i.e., freshness have been conducted with the present invention. An especially useful test for this purpose is the F test which is carried out as described below. To make performance comparison between two similar formulas they are first preferably adjusted to certain standard conditions. These conditions are: a fat content of 4.5 percent and roasting at between 350° and 450°F. for 16 minutes to a final moisture content of 2 percent. To evaluate two products of different fat content, we adjust the fat content of the specimens to the 4.5 percent level for the test. This is preferably done by changing the formulas before fabrication.

The F test is conducted using an AOM Stability Apparatus as described in AOCS Method Cd12-57. The oil bath is adjusted to hold the samples at a constant temperature of 97.8° 2°C. The unit is then calibrated so that 2.33 ml. of air per second pass through each sample using a pressure of 10 p.s.i. on the air line. The sample tubes consist of 25 × 250mm. pyrex test tubes equiped with two hole stoppers and aeration tubes.

The method is to add 20 grams of the sample to each of two, 250mm. test tubes. One of the tubes is placed in the oil bath which has progressively been brought up to the above noted temperature. The necessary connections are then made for aerating. The air flow is then started and the starting time is recorded. The second test tube is then stoppered and stored at 40°F. until time for its incubation which should be 1-4 hours later. At the desired time, 1-4 hours after the first sample has been started, the aeration of the second sample is started. The samples are then allowed to aerate at 97.8°C. Periodically the samples are examined for odor from the exhaust tube by sniffing the exhaust tube. The time is noted for the first occurance of any objectionable odor no matter how small. A record is made of the type of odor noted.

Using the F test to evaluate freshness, a product embodying the present invention and consisting of rolled oats, brown sugar syrup, raw peanut oil and wheat germ was found to have a keeping time of 123 hours. The same product, however, ground to a coarse powder was found to have a keeping time, using the F test, of only 57 hours. When chopped almonds were added to the composition of the present invention in the amount of about 5 percent, it was found that the product had a keeping time of about 82 hours as measured by the F test. On the other hand, raw chopped almonds alone and containing no coating had a keeping time of 42 hours.

Figure 2:
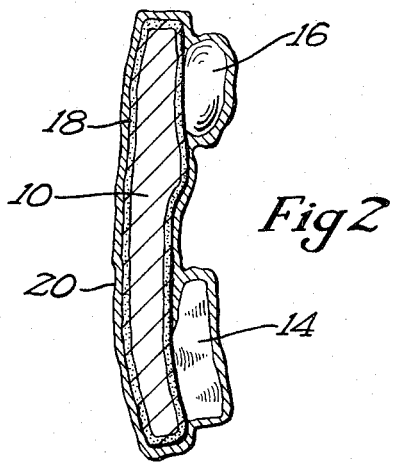
FIG. 2 is a section taken on line 2—2 of FIG. 1.

The product can be seen by reference to the figures to consist of a rolled cereal, in this case the rolled oats 10 having a number of other cereal seeds such as sesame seeds 12 bonded to the surface thereof together with other foods such as nutmeats 14 and dried cocoanut 16. As seen best in the cross-sectional view FIG. 2, the base cereal (the rolled oat 10) is impregnated at least in the surface area 18 by the edible fat and the amorphous substantially continuous discrete coating of the dried sugar syrup 20 completely encloses and encapsulates the oil coating 18 thereby helping to protect it from oxidative rancidity. The syrup coating 20 also bonds the coconut 16 and the nutmeats 14 to the surface of the base cereal 10.

Figure 3:
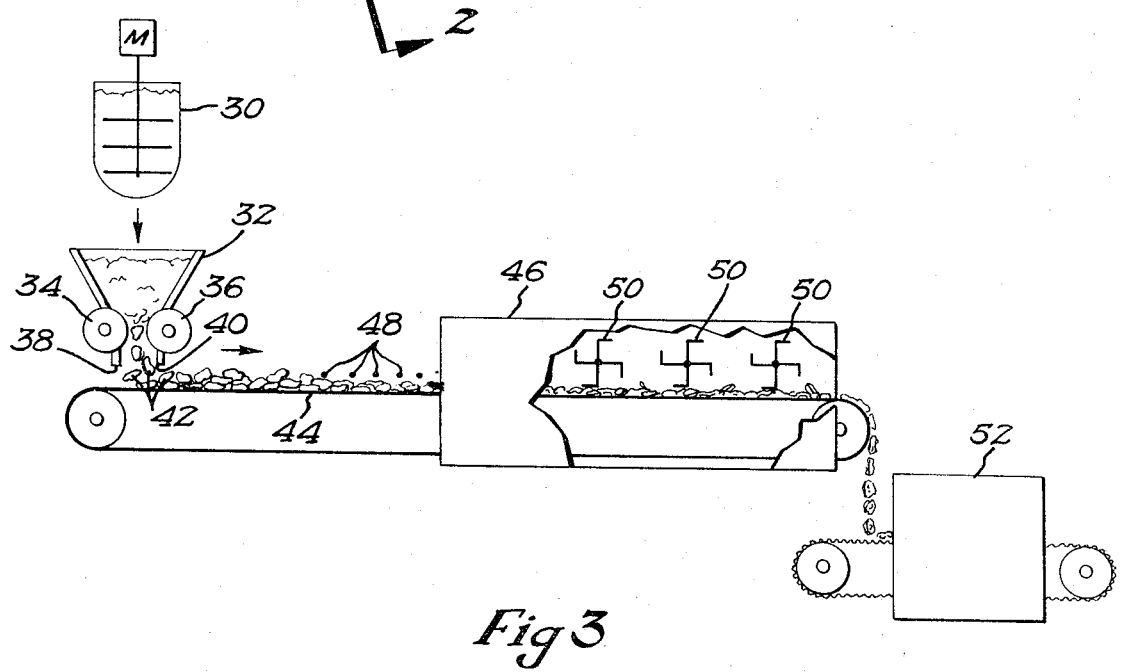
FIG. 3 is a diagramatic elevational view of the process.

Referring now to FIG. 3, which shows a portion of the processing apparatus it will be seen that the mixing is carried out in the mixer 30. The product is then transferred to a hopper 32 where it is fed between rolls 34 and 36 through an opening the width of which is controlled by edge dams 38 and 40 to provide a nip of the desired adjustable width. The product is then allowed to fall in clumps as shown at 42 onto a belt 44 such as and endless stainless steel belt which feeds the product to a roasting oven 46. Before the product arrives at the roasting oven it passes below horizontally disposed transversely extending height adjustment wires 48 which level the product entering the oven. The product then enters oven 46 and in a preferred form of the invention it is exposed to a temperature of about 450° F. initially and which falls throughout the length of the oven to about 350° F. at the outlet end during roasting time of 16 minutes. Within the oven are provided a number of rotating turners 50 which rotate slowly during operation to turn the product over itself and distribute different parts of it to the heated air within the oven. From oven 50 the product passes into the cooling chamber 52 through which ambient air is circulated.

The invention will be better understood by reference to the following examples. All quantities and percentages herein are on a wet weight basis, i.e., before roasting and drying

| | Percent by Weight | | | | | |
|---|---|---|---|---|---|---|
| Example Number | 1 | 2 | 3 | 4 | 5 | 6 |
| Rolled Oats (wheat or rye) | 62.50 | 53.50 | 51.2 | 65.2 | 77.7 | 37.7 |
| Vegetable oil | 8.50 | 8.50 | 18.0 | 3.0 | 8.5 | 8.5 |
| Wheat Germ | 1.00 | 10.00 | 3.8 | 3.8 | 3.8 | 3.8 |
| Syrup[1] | 28.00 | 28.00 | 27.8 | 28.0 | 10.0 | 50.0 |

[1] Syrup—70% solids brown sugar slurry. Honey or corn syrup can be substituted for any or all the brown sugar syrup.

Additional syrup formulations are as follows:

Additional Syrup Formulas and Useage Levels

| | A | B | C |
|---|---|---|---|
| Brown Sugar | 63.91 | 70.98 | 72.03 |
| Water | 21.28 | 23.61 | 24.02 |
| Honey | 13.85 | 4.43 | 3.95 |
| Sea Salt | 0.96 | 1.09 | |
| Total | 100.00 | 100.00 | 100.00 |

Syrup formula A can be used in the amount of about 26 percent in the Example 1 – 6 and optionally with cinnamon flavoring in the amount of about 29 percent in any of formulas 1 – 6 in place of the syrup indicated. Formula B and C can also be used either with or without added flavoring such as cinnamon flavoring in the amount from about 25–28 percent in place of the syrup designated in Examples 1 – 6.

| | Percent by Weight | | | | |
|---|---|---|---|---|---|
| Example Number | 7 | 8 | 9 | 10 | 11 |
| INGREDIENT | | | | | |
| Rolled Oats | 52.36 | 52.45 | 53.26 | 53.21 | 53.26 |
| Peanut Oil | 8.24 | 8.24 | 8.24 | 8.24 | 8.24 |
| Sesame Seeds | 5.36 | 5.22 | 4.02 | 4.02 | 4.02 |
| Wheat Germ | 3.58 | 3.58 | 3.58 | 3.58 | 3.58 |
| Almonds | 4.47 | 4.47 | 4.47 | 4.47 | 4.47 |
| Brown Sugar | 16.61 | 16.83 | 18.76 | 18.76 | 16.94 |
| Water | 5.53 | 5.60 | 6.25 | 6.25 | 5.64 |
| Honey | 3.60 | 3.36 | 1.17 | 1.17 | 3.60 |
| Sea Salt | .25 | .25 | .25 | .25 | .25 |
| Cinnamon | — | — | — | .05 | — |

| | Percent by Weight | | |
|---|---|---|---|
| Example Number | 12 | 13 | 14 |
| Ingredient | | | |
| Rolled Oats | 54.74 | 48.05 | 50.52 |
| Peanut Oil | 8.50 | 7.60 | 7.60 |
| Sesame Seed | 4.32 | 4.50 | 3.37 |
| Wheat Germ | 3.80 | 3.20 | 3.20 |
| Brown Sugar | 18.25 | 17.19 | 18.23 |
| Water | 6.08 | 5.73 | 6.08 |
| Honey | 3.96 | 3.73 | 1.00 |
| Sea Salt | .25 | — | — |
| Cinnamon | .10 | — | — |
| Cashews (chopped) | — | 5.00 | 5.00 |
| Cocoanut (shredded) | — | 5.00 | 5.00 |

What is claimed is:

1. A process for forming double coated clustered, ready-to-eat mixed cereal product comprising:
   a. providing flattened raw grain base cereal comprising a member selected from the group consisting of wheat, rye and oats,
   b. admixing additional cereal grains or parts,
   c. forming a first layer of a double coating on the grain resulting from (a) and (b) by impregnating at least the surfaces of the base cereal with an edible fat by applying the the fat in a liquid condition to the surfaces of the base cereal to provide a substantially continuous layer of fat impregnation at the surface thereof,
   d. thereafter applying a second layer of the double coating comprising sugar syrup to the surfaces of the product and simultaneously agitating the mass to distribute the sugar syrup over the surfaces of the cereal and form clusters, said syrup being substantially fat free,
   e. the fat impregnated into the surface of the cereal causing the sugar syrup to remain on the surfaces of the cereal and the syrup being thereby distributed as a substantially continuous film of syrup over said surfaces to promote crispiness of the product and to shield the fat from oxidative rancidity and,
   f. thereafter roasting said clusters at a temperature between about 300° and 450°F. for sufficient time to provide a cooked color and flavor and to dry the clusters to a moisture content of less than 5 percent, said syrup adhering the cereal pieces together at their points of contact to form the clusters, whereby the finished product has an F test value of at least 100 hours keeping time.

2. The process of claim 1 wherein the fat is applied in the liquid state to the cereal and the cereal is stirred to distribute the fat thereon.

3. The process of claim 1 wherein the syrup is a sugar syrup having a solids basis of 50–80 percent and the syrup is admixed in the amount of from about 10–50 percent on a wet basis and roasting is carried out at between about 250° and 600°F. until the product is dried to a moisture content of 5 percent or less.

* * * * *